No. 706,328. Patented Aug. 5, 1902.
F. MAY.
CHEESE CUTTER.
(Application filed Jan. 22, 1902.)
(No Model.)
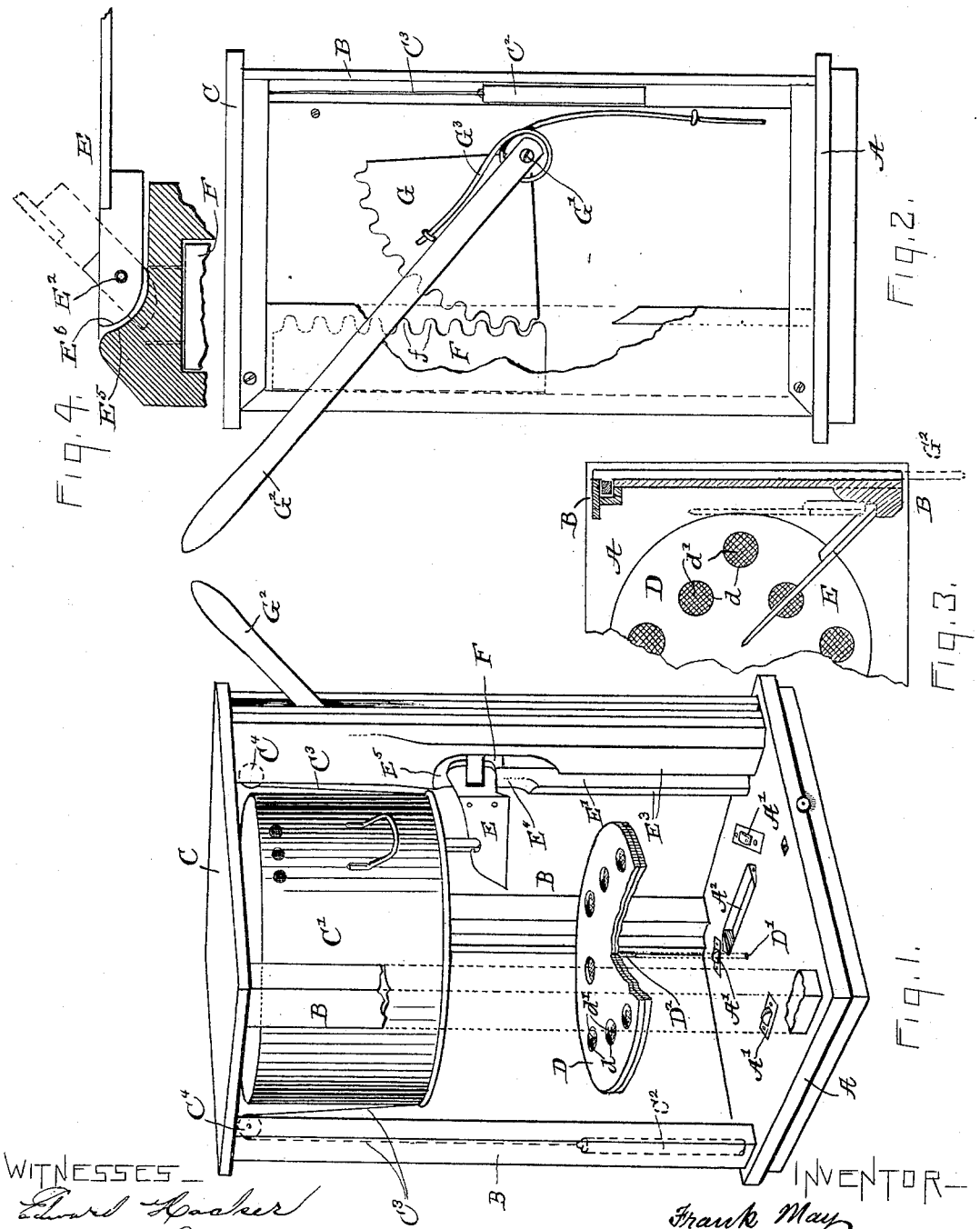

UNITED STATES PATENT OFFICE.

FRANK MAY, OF KNOXVILLE, TENNESSEE.

CHEESE-CUTTER.

SPECIFICATION forming part of Letters Patent No. 706,328, dated August 5, 1902.

Application filed January 22, 1902. Serial No. 90,824. (No model.)

*To all whom it may concern:*

Be it known that I, FRANK MAY, a citizen of the United States, residing at Knoxville, in the county of Knox and State of Tennessee, have invented certain new and useful Improvements in Cheese-Cutters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to that class of cheese-cutters which are applied to cheese-safes.

The object of my invention is to combine with a cheese-safe having a vertically-shiftable cover for the cheese a knife which is adapted to stand radially to the axis of the cheese and reciprocate vertically and to shift out of the range of the cover when the latter is to be lowered into position over the cheese.

In the accompanying drawings, Figure 1 is a perspective, partially in section, illustrating an apparatus embodying my invention, the turn-table being raised to expose the base of the apparatus. Fig. 2 is a rear view, the outer wall having been removed. Fig. 3 is a horizontal section taken just above the knife. Fig. 4 is a larger horizontal section taken just above the knife.

Referring to said drawings, A is the base of the apparatus. From said base rise four posts B. Said posts support the top C.

D is a turn-table pivoted at D' on a spindle $D^2$, extending downward from the center of said turn-table into said base A at D'. Rollers A', supported by said base, form supports for the margin of said turn-table. The cheese is to rest upon said turn-table, the axes of the cheese and said turn-table being in the same line. Said turn-table is preferably provided with vertical apertures $d$, across which apertures extends wire-netting $d'$. Said turn-table is preferably formed of a plurality of layers of wood, said wire-netting being placed between two of said layers and said layers being joined to each other in any suitable manner, as by gluing. The object of said apertures $d$ is to permit the rising of vapor coming from a suitable water-receptacle located in said base. $A^2$ shows such a receptacle. The function of said vapor is to moisten the cheese, and the function of said wire-netting is to close said apertures against the passage of insects from the space beneath said turn-table to or into the bottom of the cheese. By locating said apertures so as to bring the vapor against the base of the cheese said vapor will permeate and moisten said cheese more evenly than would be the case were the moisture applied to the cheese from above. The turn-table being rotary on a vertical axis any portion of the cheese may be turned into range with the knife reciprocating on relatively stationary ways.

The cover C' is of any well-known form and is of proper depth and diameter to extend over the cheese and the turn-table and rest by its lower edge upon the base A when the knife is not to be operated. Said cover may be raised by hand and secured in the elevated position by any well-known means, or it may be suspended by counterbalance-cords. For this purpose the drawings show weights $C^2$ and cords $C^3$ extending from said weights over pulleys $C^4$ to said cover.

E is the knife. This has its cutting edge directed downward and is of proper length to bring its point to the vertical axis of the turn-table. It is located above the turn-table and hinged to a vertically-sliding member F, confined in a suitable way E' adjacent to or in one of the posts B. The hinge by which said knife is joined to said sliding member F is located at $E^2$, Fig. 4. The way E' has at each side of its lower portion a wall the inner face of which is radial to the axis of the turn-table, and said faces have sufficient space between them for the passage of the knife, and yet the space is so limited as to confine the knife sufficiently to permit it to move only in a vertical plane. At the upper portion of said way the face of said wall toward the back of said apparatus is cut away obliquely, as indicated at $E^4$, and above the knife said way is arched and provided with an oblique cam-face $E^5$. (See Figs. 1 and 4.) The portion of the heel of the knife which is directed toward the back of the apparatus is cut away to form an oblique surface, as shown at $E^6$, Fig. 4, whereby the extreme portion of said heel is brought forward of a vertical plane extending through the hinge of the knife parallel to said knife.

In operation, assuming that the knife is in the elevated position and turned back out of the range of the cover, the sliding member F is depressed, whereby the knife E is carried downward and by contact with the inner face of the rearmost wall of the way E' said knife is turned forward until it stands radial to the axis of the turn-table. The faces at each side of the lower portion of said way being vertical this radial position of the knife is maintained while the knife descends to the turn-table. When the member F is again raised, the knife maintains the radial position until the heel $E^6$ comes into contact with the oblique face $E^5$, and is thereby turned forward, causing the knife to turn upon the hinge $E^2$, the body of the knife swinging rearward parallel to the back of the apparatus and out of range of the cover. This automatic lateral movement of the knife may obviously be effected by various modifications of the mechanism described, and said knife may be arranged to be swung laterally by hand. The member F may be reciprocated by any suitable means. The drawings show the rear edge of said member provided with gear-teeth $f$, whereby said member becomes a rack-gear. A segment-gear G is shown hinged at G' and arranged to mesh with the member F and provided with a hand-lever $G^2$, whereby said member may be drawn downward. A spring $G^3$ is suitably applied to lift said segment G and said member F and knife E when the hand-lever is released; but it is to be understood that said spring may be omitted and the parts mentioned raised by hand.

I claim as my invention—

1. In a cheese-cutter, the combination with a base, a turn-table, and a vertically-shiftable cover, of a vertically-reciprocable knife supported outside of the range of said cover and adapted to be turned so as to extend radially substantially to the axial line of said turn-table and to be turned laterally out of the range of said cover, substantially as described.

2. In a cheese-cutter, the combination with a base, a turn-table, and a vertically-shiftable cover, of a knife secured to a vertically-reciprocable support outside of the range of said cover at a suitable distance from the axial line of the turn-table to permit the point of said knife to extend substantially to said axial line, suitable guides for turning said knife laterally out of the range of said cover when said knife is at the upper limit of its vertical movement and for turning said knife into the working position when it descends, substantially as described.

In testimony whereof I affix my signature, in presence of two witnesses, this 17th day of January, 1902.

FRANK MAY.

Witnesses:
EDWARD HACKER,
CYRUS KEHR.